(12) United States Patent
Berger

(10) Patent No.: US 6,473,128 B1
(45) Date of Patent: Oct. 29, 2002

(54) TELEVISION SIGNAL PROCESSING DEVICE FOR AUTOMATICALLY SELECTING AND INDICATING THE BEGINNING OF TELEVISION PROGRAM OF INTEREST TO THE USER

(75) Inventor: Gerald Berger, Maria Enzersdorf (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/316,781

(22) Filed: May 21, 1999

(30) Foreign Application Priority Data

May 22, 1998 (EP) .............................. 98890151

(51) Int. Cl.[7] .......................... H04N 11/00; H04N 7/00
(52) U.S. Cl. ....................... 348/461; 348/906; 348/569; 725/53
(58) Field of Search ................................. 348/465, 563, 348/564, 569, 570, 906, 861, 461, 468, 553; 725/53, 39.61; 345/721; H04M 11/00, 7/00

(56) References Cited

U.S. PATENT DOCUMENTS

| | | | | |
|---|---|---|---|---|
| 5,557,338 A | * | 9/1996 | Maze et al. ................. | 348/565 |
| 5,867,226 A | * | 2/1999 | Wehmeyer et al. .......... | 348/563 |
| 5,986,650 A | * | 11/1999 | Ellis et al. .................... | 348/569 |
| 6,216,264 B1 | * | 4/2001 | Maze et al. .................... | 725/53 |

FOREIGN PATENT DOCUMENTS

EP 0337336 A2 10/1989 .......... H04N/7/087

* cited by examiner

Primary Examiner—Michael H. Lee
(74) Attorney, Agent, or Firm—Edward W. Goodman

(57) ABSTRACT

A television signal processing device (12) has a receiver for receiving a television signal (F) and an information signal (I) which contains television program information (FPI), for example, title information about future television programs. The television signal processing device (12) can automatically display a display signal (A) which is reproducible on a display screen (3) and which indicates the title of a currently or shortly starting television program and the receiving channel (E) or the television station from which this television program is or will be receivable, when the receiver (4) of the television signal processing device (12) currently receives the television signal (F) from another television station in another receiving channel (E) and when the title of this television program contains at least one given keyword.

9 Claims, 3 Drawing Sheets

| Keyword | Recurrence count |
|---|---|
| Children | 3 |
| Austria | 4 |
| Golf | 2 |
| Championship | 4 |
| Sailing | 1 |
| Opera | 2 |
| Soccer | 7 |
| Airplane | 1 |
| Magnum | 6 |
| Dreamboat | 1 |
| Computer | 4 |
| Diana | 7 |
| News | 12 |
| Garden | 3 |

TELEVISION SIGNAL PROCESSING DEVICE FOR AUTOMATICALLY SELECTING AND INDICATING THE BEGINNING OF TELEVISION PROGRAM OF INTEREST TO THE USER

BACKGROUND OF THE INVENTION

1. Field of the Invention

The invention relates to a television signal processing device having receiving means for receiving at least one television signal in at least one receiving channel receivable by the receiving means, and for receiving at least one information signal, and having television program information determining means for determining and storing television program information contained in one or more information signals and relating to television programs of at least one receivable receiving channel, and having display signal generating means for automatically generating a display signal containing detected television program information of a television program whose television signal is currently received by the receiving means.

2. Description of the Related Art

Such a television signal processing device of the type defined in the opening paragraph, included in a television set, is known from the document is known from European Patent Application EP 0 337 336 A2. The known television set has receiving means with which it is possible to receive a television signal, which can be reproduced as a television program on a television set which can be connected from a television station—as, for example, ARD, ZDF or CNN—in a receiving channel. A received television signal can be displayed as a television program on a viewing screen of the television set.

The receiving means is further adapted to receive an information signal transmitted in blanking intervals of a television signal. The information signal conveys digital data including VPS information (Video Program System) and teletext information. Each television program received as a television signal is identified by given VPS information. VPS information also includes television signal identification information which identifies a television signal and by means of which the television station, which makes a television signal available and which transmits this signal, can be identified. Teletext information of a television signal may include television program information about television programs of one or more receiving channels which can be received, for example, within the next week Television program information can be formed by digital data representative of television signal identification information, the date, the starting and ending time, the title as well as the VPS information of a television program.

The known television set further comprises television program information determining means for determining and storing television program information contained in the information signal. For this purpose, the television program information determining means uses a television program information determining algorithm in which each receivable receiving channel, in which a television signal containing an information signal in the blanking intervals can be received, is successively received by the receiving means for a given period of time in order to determine and store television program information for receivable television signals of as many television programs as possible.

The known television set is then adapted to compare VPS information currently received by the receiving means with VPS information determined and stored by the television program information determining means in the television set, and is adapted to determine television program information of television program currently received by the receiving means. Subsequently, a display signal generating means is automatically adapted to generate a display signal which can be reproduced on the viewing screen of the television set as an on-screen display to display the title of the television program currently received by the television signal. Thus, a user of the known television set is informed about the title of the television program at the beginning of each television program received by the television set.

Moreover, by the actuation of a key of the remote control device of the known television set, the television set can display a list of receiving suggestions which contains the titles and starting times of television programs and television signal identification information of the television stations from which these television programs can be received currently or shortly. When the receiving means can receive, for example, 40 different television signals in 40 receiving channels, such a list of receiving suggestions will have up to 80 rows, a currently receivable television program and a shortly receivable television program, i.e., starting, for example, at the latest within half an hour, being given for each receiving channel. With the aid of the list of receiving suggestions, the user can select a currently or shortly receivable television program he/she is interested in without briefly viewing each currently receivable television program of each receiving channel by actuation of a Channel Up key or Channel Down key.

It has been found that, with the known television set, the automatic display of the title of the television program of the currently received receiving channel is very informative for the user, but that this does not provide any indication about which television programs are currently receivable in other receiving channels or which television programs are shortly receivable in other receiving channels. As a result, the user will very often view a television program which is only of mediocre interest to him/her, while, at the same time, a television program which is highly interesting for him could be received in another receiving channel.

This problem is neither solved by means of the list of receiving suggestions which can be displayed by the actuation of a key of the remote control device of the known television set because the user probably reads this list of receiving suggestions, which may have many rows, one time at the beginning of an evening of television in order to pick a television program which may be of interest to him but will definitely not do so every half an hour, although this would be necessary in order not to miss the beginning of an interesting television program. Furthermore, scrolling through a list of receiving suggestions resembling a computer list is a nuisance for a user who is not familiar with a computer, for which reason the list of receiving suggestions is used only seldom by users of the known television set.

SUMMARY OF THE INVENTION

It is an object of the invention to eliminate the aforementioned problems and to provide an improved television signal processing device of the type defined in the opening paragraph. In a television signal processing device of the type defined in the opening paragraph, this object is achieved in that the television signal processing device further comprises selection means for selecting at least one television program having title information contained in the detected television program information containing at least one given keyword and which is currently receivable or will be shortly receivable by the receiving means as a television signal in another than the currently received receiving channel, and in that display signal generating means automatically generates a display signal containing television program information of the at least one selected television program. Thus, it is achieved that a display signal, which is reproducible as an on-screen display, can be displayed automatically by a television signal processing device included in, for example, a television set, this display signal indicating the title of a current starting television program and the television signal identification information or the receiving channel on which this television program is receivable when the receiving means of the television set currently receives a television signal in another receiving channel. Such an on-screen display can be shown, for example, for 5 seconds. This has the advantage that the user's attention is drawn to the start of a television program which otherwise he/she might have missed because the television set has been tuned to receive a television signal with different television signal identification information in another receiving channel.

A further advantage is that the user is only reminded of those television programs whose titles contain at least one keyword which is characteristic of the user's field of interest. As a result of this, the user is reminded automatically and in due time of the beginning of television programs which are of interest to him.

In a television signal processing device as described above, it has proven to be advantageous that the television signal processing device further comprises keyword detection means for detecting at least one item of title fragment information of title information of a television program received by the receiving means as a keyword, and in that at least one detected keyword can be used as a given keyword by the selection means. This yields the advantage that each title of a television program received by the user by means of the television signal processing device because he is interested in this television program is used for determining at least one keyword characteristic of the field of interest of the user. Advantageously, a keyword is then determined automatically without the intervention of the user.

In a television signal processing device as described above, it has proven to be advantageous that a keyword memory is provided for storing at least one keyword detected by the keyword detection means. This has the advantage that all the automatically determined keywords are stored and thus a database of keywords is obtained which is a very accurate representation of the user's interest profile with regard to the television programs viewed by the user and what future television programs he/she is likely to be interested in. A list drawn up by the selection means, giving receiving suggestions of television programs whose titles contain at least one of the stored keywords, will therefore include a multitude of television programs which are of interest to the user. On the other hand, the list of receiving suggestions only gives television programs which are of interest to the user, which has the advantage that the list of receiving suggestions has limited number of rows.

In a television signal processing device as described above, it has proven to be advantageous that the keyword memory is adapted to store a recurrence count for each keyword, this recurrence count being incremented upon each further detection of this keyword by the keyword detection means, and in that the selection means applies only those keywords whose recurrence counts have values which exceed a selection threshold value which depends on at least one other value of a recurrence count stored in the keyword memory. As a result of this, it is achieved that the selection means only selects those television programs whose titles include a keyword which has already been detected comparatively frequently and is, therefore, of particular interest to the user. Thus, changing interests of the user are taken into account automatically because the count of the occurrence of a keyword as, for example, "Magnum" is not incremented if no further installment of the serial "Magnum" is received.

In a television signal processing device as described above, it has proven to be advantageous that keywords whose recurrence counts have values below a minimum threshold value are periodically erasable from the keyword memory by the keyword detection means. As a result of this, it is achieved that only rarely detected keywords are erased periodically, for example, once a month, from the keyword memory, and the storage capacity of the keyword memory is thus utilized effectively. Moreover, it is thus achieved that only those keywords which have been detected not too long ago are used for determining television programs which are likely to interest the user.

In a television signal processing device as described above, it has proven to be advantageous that the keyword detection means detects only title fragment information having a minimum number of characters as keywords. Thus, it is achieved that words which are used in a title and which form title fragment information—such as, for example, "the", "as" or "in"—are not used for determining keywords if they comprise, for example, only three or less letters and also occur in other meanings in a plurality of words and are, therefore, not suitable for describing the field of interest of the user.

In a television signal processing device as described above, it has proven to be advantageous that an exclusion memory is provided for storing at least title fragment information which is to be excluded as a keyword by the keyword detection means. Thus, it is achieved that certain words which form title fragment information—such as, for example, "when" or "maybe"—are not defined as keywords because these words are not suitable for describing the field of interest of the user.

In a television signal processing device as described above, it has proven to be advantageous that the receiving means is adapted to receive an information signal from a computer data network. Thus, it is achieved that an information signal containing television program information can be received by the television signal processing device from a computer data network, such as the Internet, a cable TV system or via a data link to a computer.

In a television signal processing device as described above, it has proven to be advantageous that the receiving means is adapted to receive an information signal in blanking intervals of a received television signal, this information signal containing teletext information which can be displayed on display means, and in that at least title fragment information of the teletext information can be marked manually and can thus be defined as a keyword. Thus, the advantage is obtained that television program information can also be derived from teletext information of one or more television signals. Furthermore, a user can mark words or character strings forming title fragment information in teletext pages, and can thus be selected as keywords. This method of manually selecting a keyword is substantially simpler than entering a keyword by the actuation of remote control keys to which a letter of the alphabet has been assigned.

It has proven to be advantageous to include a television signal processing device as described above, in a recording arrangement having recording means for recording a processed received television signal of a television program, characterized in that keyword detection means is provided for detecting at least one item of title fragment information of title information of a television program received as a processed received television signal recorded by the recording arrangement as at least one keyword, and in that at least one detected keyword can be used as a given keyword by the selection means. In the case of a television signal processing device included in a recording arrangement, this yields the advantage that only character strings forming title fragment information of the titles of television programs recorded by means of the recording arrangement, are defined as keywords, which ensures that they characterize the field of interest of the user.

In a recording arrangement as described above, it has proven to be advantageous that display signal generating means is adapted to be also activated manually so as to generate a display signal representing television program information of selected television programs, and in that the display signal can be applied to display means capable of displaying a list of recording suggestions containing television program information of at least one selected television program, and in that television program information of one of the selected and displayed television programs can be marked manually by recording programming means and the recording arrangement is thereby programmable to record the television program thus marked. A user can then actuate a suggestion programming key of the recording arrangement, which enables display signal generating means to generate a display signal representing a list of recording suggestions, this signal being displayable as a list of recording suggestions. By the actuation of a marking key, one of the selected television programs given in the list of recording suggestions can be marked manually by the user, and the recording arrangement can thus be programmed so as to record the marked television program. This yields a particularly simple method of programming the recording arrangement in order to record a selected television program.

The afore-mentioned as well as further aspects of the invention will be apparent from the embodiment described hereinafter by way of example and will be elucidated with reference to this embodiment.

BRIEF DESCRIPTION OF THE DRAWINGS

In the drawings:

FIG. 3 shows a keyword table which can be stored in a keyword memory of the video recorder.

DESCRIPTION OF THE PREFERRED EMBODIMENTS

Figure 1:
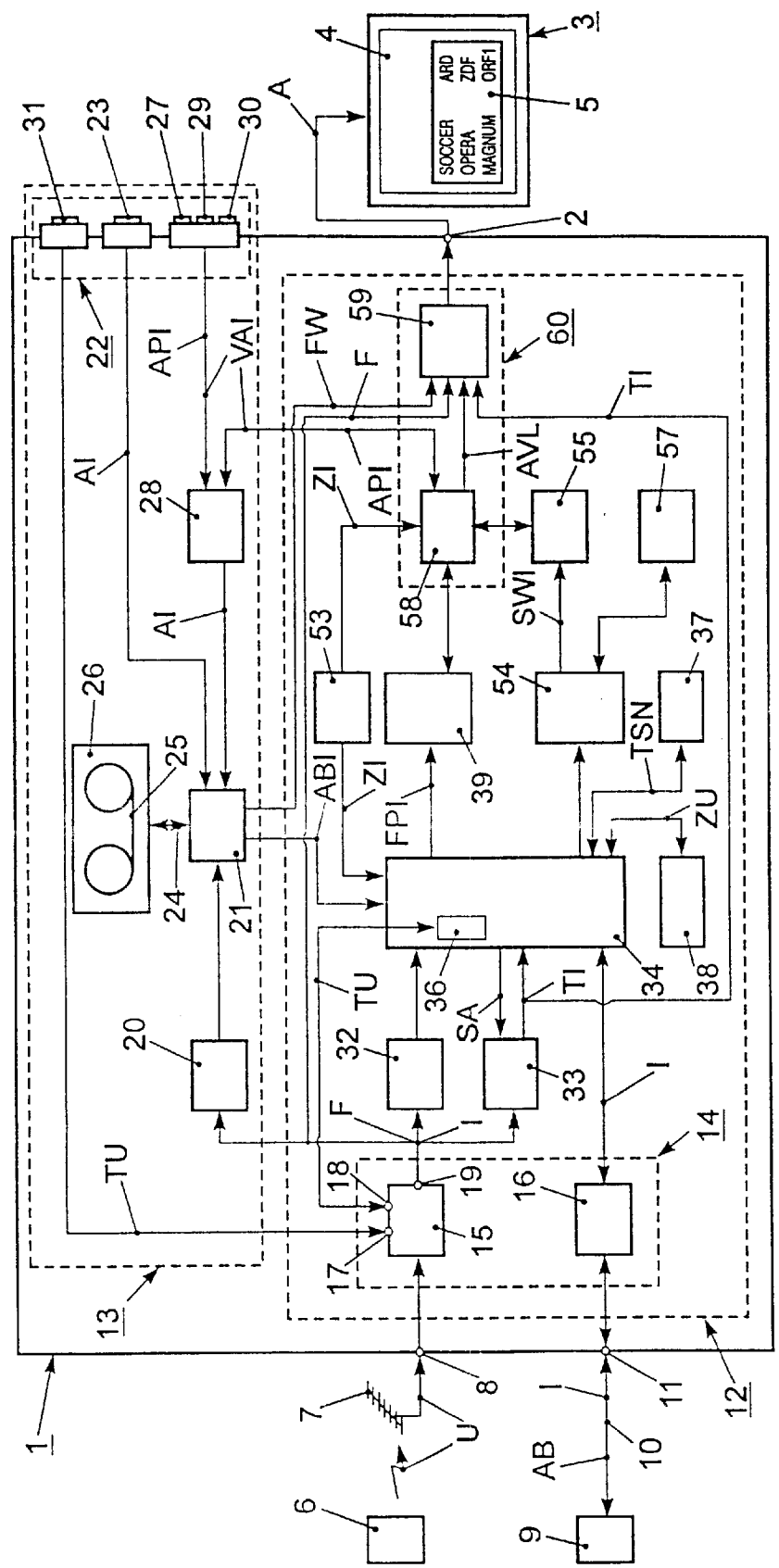
FIG. 1 is a block diagram of a video recorder forming a recording arrangement and including a television signal processing device having keyword detection means for determining character strings of a title as a keyword indicative of the field of interest of a user of the video recorder.

FIG. 1 shows a video recorder 1 which constitutes a recording arrangement. A display signal A can be applied from an output terminal 2 of the video recorder 1 to a television set 3 which forms a display means connected to the output terminal 2. A display signal A comprises a television signal F, which can be displayed as a television program on a viewing screen 4 of the television set 3 and, if applicable, an OSD signal, which can be displayed on the viewing screen 4 as a so-called on-screen display 5 and which contains text information.

A broadcasting station 6 can transmit a transmission signal U, which can be received by means of a receiving antenna 7. A transmission signal U comprises a plurality of television signals F from different television stations, these television signals each being transmitted via a receiving channel E. A receiving channel E, which is identified by a frequency band of the transmission signal U, transmits, for example, a television signal F which conveys television programs from the television station ORF1 and which is identified by television signal identification information FKI. Television signals F, which convey television programs from the television stations ORF2, ARD, ZDF and other television stations, some of which are identified by further television signal identification information FKI, are transmitted via further receiving channels E.

In some of the television signals F transmitted by the broadcasting station 6, information signals I are transmitted in blanking intervals of the television signals F in which no picture or sound information is transmitted. An information signal I conveys digital data containing VPS information (Video Program System) and teletext information TI. Each television program received as a television signal F is identified by given VPS information. Moreover, the VPS information of an information signal I also includes television signal identification information FKI which identifies the television signal F. Teletext information TI can be received as data block information in data blocks, which are known as teletext pages, in successive receiving cycles having the same content which recur substantially every 30 to 60 seconds. Teletext information TI of a television signal F may contain a multitude of information, such as, for example, news information, weather information, and, inter alia, also television program information FPI of television programs from one or more television stations. The television program information FPI can be information which includes television signal identification information FKI, such as the date, the starting time and ending time, title information representing the title as well as the VPS information of a given television program. As a rule, teletext information TI includes television program information FPI of television programs which can be received, for example, within the next week, as a television signal F via a television channel E, this television signal being identified by television signal identification information FKI included in the teletext information TI. A transmission signal U received by the receiving antenna 7 can be applied to an input terminal 8 of the video recorder 1.

A computer 9 can supply a further information signal I containing further television program information FPI to an information signal terminal 11 of the video recorder 1 via a data link 10 of a computer data network. The computer 9 then forms a so-called server which is connected to the Internet and which stores current television program information FPI about television programs from a large number of television stations in digital form. Television program information FPI stored in the computer 9 can be retrieved by the video recorder 1 via the data link 10 as an information signal I. For this purpose, the video recorder 1 can transfer call information AB from the information signal terminal 11 to an Internet address which identifies the computer 9. When call information AB appears, the computer 9 is enabled to transfer the television program information FPI stored in the computer 9 to the information signal terminal 11 of the video recorder 1 via the data links 10.

The video recorder 1 comprises a television signal processing device 12 and recording means 13. The television signal processing device 12 is adapted to process a transmission signal U received at the input terminal 8 and an information signal I applied to the information signal terminal 11, and also to independently derive television program information FPI from the received information signals I. The television signal processing device 12 includes receiving means 14 formed by a tuner 15 and interface means 16. The interface means 16 of the receiving means 14 is connected to the information signal terminal 11 and, as explained hereinbefore, is adapted to receive an information signal I from a computer data network.

The tuner 15 is connected to the input terminal 8 and is adapted to receive at least one television signal F contained in the transmission signal U over at least one receiving channel E which is receivable by the receiving means 14, and to receive an information signal I conveyed in the blanking intervals of a television signal F. this information signal comprising data blocks containing data block information and being received in recurring receiving cycles. The data block information is then formed by teletext information TI and the data blocks by teletext pages.

A so-called tuner voltage TU can be applied to the tuner 15 via the tuner inputs 17 and 18. When a tuner voltage TU appears, a television signal F transmitted in the transmission signal U via the receiving channel defined by the tuner voltage TU, together with an information signal I which may be contained in the television signal F. can be supplied to a tuner output 19 of the tuner 15.

The recording means 13 includes a recording signal processing stage 20 to which a received television signal F supplied to the tuner output 19 can be applied. A received television signal F processed in the recording signal processing stage 20 can be applied to a control stage 21 of the recording means 13. The recording means 13 further includes a keypad 22 having a plurality of keys for controlling the video recorder 1. The keys include a recording key 23 for applying a recording activation signal AI to the control stage 21 to activate a recording mode of the video recorder 1. The recording means 13 is adapted to record a processed and received television signal F of a television program in the recording mode. For this purpose, a processed and received television signal F from the control stage 21 can be recorded on a magnetic tape 25 of a magnetic-tape cassette 26 via a recording and playback line 24. Such a recording and playback line 24, by means of which a processed and received television signal F can be recorded and played back in accordance with a helical-scan recording and playback method in conformity with the VHS standard, has been well known for a long time.

The keypad 22 further comprises keys, represented here as a Show-View programming key 27, for programming the recording means 13 in accordance with the well-known Show-View programming method in order to record a television program that can be received at a later instant. In accordance with the Show-View programming method, a given numerical combination, which identifies the date, the starting and ending time and the television signal identification information FKI of a television program, can be entered in order to program the recording means 13 for recording this television program. A numerical combination entered by means of the Show-View programming keys 27 as recording programming information API can be applied to a recording programming stage 28 of the recording means 13. In a manner not shown in FIG. 1, the recording programming stage 28 is adapted to supply a recording activation signal AI to the control stage 21 for recording a scheduled television program exactly at the instant at which the scheduled television program is received by the video recorder 1.

The keypad 22 further comprises keys, represented here as a suggestion programming key 29, which, in a simple manner, enable a television program to be programmed for recording, wherein the title of the television program is displayed on the on-screen display 5 of the viewing screen 4 and which is marked by a user of the video recorder 1, as will be described in more detail hereinafter.

The keypad 22 further comprises keys, represented here as a marking key 30, for marking a character string of text information shown on the on-screen display 5, as will also be described in more detail hereinafter.

The keyboard 22 further comprises keys, represented here as a receiving channel selection key 31, for generating and applying tuner voltages TU to the tuner input 17 of the tuner 15. Actuation of the receiving channel selection key 31 allows a user of the video recorder 1 to select a television signal F from the television signals F transmitted in the transmission signal U via receiving channels E, this television signal being available on the tuner output 19 of the tuner 15.

A television signal F on the tuner output 19 together with an information signal I which may be present in blanking intervals of the television signal F can be applied to a decoder stage 32 of the television signal processing device 12. The decoder stage 32 is adapted to detect VPS information which may be present in the information signal I.

A television signal F, appearing on the tuner output 19 together with an information signal I which may be present in blanking intervals of the television signal F, can further be applied to an information detection stage 33 formed by a so-called teletext IC. The information detection stage 33 is adapted to detect data block information identified by a given data block address in each receiving cycle of the received information signal I, and thus to detect teletext information TI contained in the information signal I. The information detection stage 33 can be preset with a data block address formed by a teletext page number TSN, upon which the information detection stage 33 is adapted to detect the teletext page identified by the teletext page number TSN and teletext information TI contained therein in a receiving cycle of the received information signal I.

The television signal processing device 12 further comprises television program information determining means 34 for detecting and storing television program information FPI contained in one or more information signals I for the television signal F of television transmissions of at least one receivable receiving channel E, and for thus detecting television program information FPI contained in data block information detected by the information detection stage 33. The television program information determining means 34 is further adapted to preset at least one further data block address for the information detection stage 33 to detect further television program information FPI contained in the information signal I. For this purpose, VPS information detected by the decoder stage 32 and teletext information TI detected by the information detection stage 33 can be applied to the television program information determining means 34.

The television program information determining means 34 uses a program information determining algorithm for determining television program information FPI from the teletext information TI supplied to the television program information determining means 34 by the information detection stage 33, and which is explained hereinafter with reference to a flowchart 35 shown in FIG. 2. The television program information determining means 34 includes a switching stage 36 which, during the execution of the television program information determining algorithm, can independently switch the receiving means 14 to the reception of at least one further information signal I in blanking intervals of the television signal F in order to enable further television program information I to be determined independently by the television signal processing device 12. For this purpose, the switching stage 36 is connected to the tuner input 18 of the tuner 15 and is adapted to supply a tuner voltage TU which controls the tuner 15. This will be described in greater detail in the description of the television program information determining algorithm.

The television signal processing device 12 further includes a data block address memory 37 which can store at least one item of television signal identification information FKI identifying a received television signal F or receiving channel identification information EKI with at least one associated data block address which identifies a data block of an information signal I contained in a television signal F received via a receiving channel E. Each receiving channel E that can be received by the tuner 15 is identified by receiving channel identification information EKI. In currently commercially available video recorders, for example, 99 receiving channels E can be stored at so-called program positions whose numbers form receiving channel identification information EKI. The data block address memory 37 can store a data block address formed by a teletext page number TSN for each item of receiving channel identification information EKI which identifies a receiving channel via which a television signal F can be received. During the manufacture of the video recorder 1, a teletext page number TSN =301 has been stored in the data block address memory 37 for each item of receiving channel identification information EKI because this teletext page number TSN identifies teletext information TI which very often contains television program information FPI for the currently known information signals I. During the manufacture of the video recorder 1 teletext page numbers TSN relating to teletext information TI containing the television program information FPI have been stored in the data block address memory 37, in correlation with television signal identification information FKI of those information signals I which contain television signal identification information FKI. The television program information determining means 34 is adapted to determine stored teletext page numbers TSN for received television signal F by comparing television signal identification information FKI of television signals F determined by the decoder stage 32 with television signal identification information FKI stored in the data block address memory 37. This will be elucidated with reference to the flowchart 35.

The television signal processing device 12 further includes an additional information memory 38 in which additional information ZU about the information signal I can be stored, in correlation with television signal identification information FKI of the television signal F or receiving channel identification information EKI of the receiving channel E, this additional information having already been derived from an information signal I of a television signal F received via a receiving channel E in a television program information determining algorithm, and can be used advantageously for a subsequent television program information determining algorithm. The additional information ZU can be, for example, information that VPS information, VPT information or time information has already been found in teletext information TI of a teletext page, or information whether a teletext page has teletext sub-pages. Teletext sub-pages contain teletext information TI which cannot be received in every receiving cycle of the information signal I. The teletext page having the teletext page number TSN= 301 has, for example, two teletext sub-pages. In this case, only the teletext information TI of the teletext sub-page 301/1 is received in one or more receiving cycles of the information signal I, and subsequently, only the teletext information TI of the teletext sub-page 301/2 is transmitted in one or more receiving cycles. Additional information ZU can also be transmission information which indicates which teletext page numbers TSN are transmitted in the information signal I.

During the manufacture of the video recorder 1, additional information ZU about information signals I containing television signal identification information FKI has been stored in the additional information memory 38, in correlation with said television signal identification information FKI. The television program information determining means 34 is adapted to determine stored additional information ZU about received television signal F by comparing television signal identification information FKI of television signal F detected by means of the decoder stage 32 with television signal identification information FKI stored in the additional information memory 38. Additional information ZU about information signals I facilitate and speed up the determination of television program information FPI in the television program information determining algorithm. This will be described in more detail with reference to the flowchart 35.

The television signal processing device 12 further includes a television program memory 39 in which television program information FPI derived from a received information signal I can be stored, this information relating to television programs which can be received, for example, within the next week from one or more television stations via one or more receiving channel E.

Hereinafter, the television program information determining algorithm executed in the television program information determining means 34 is explained with reference to the flowchart 35. The process in accordance with the flowchart 35 starts in a block 40, for example, every day at 9:00 a.m. Most receiving channels E can already receive a television signal F at this time and it is known that video recorders are rarely used at that hour. As already explained hereinbefore, the television program information determining algorithm is carried out only when the video recorder 1 is not being used by the user and, consequently, the television signal processing device 12 can independently carry out the television program information determining algorithm in accordance with the flowchart 35.

In a block 41, which is carried out subsequently to the block 40, it is ascertained whether the video recorder 1 is in a stand-by mode or whether the video recorder 1 is being used by a user, for example, for playing back a recorded television program from the cassette 26. When the video recorder 1 is not in the stand-by mode, the television program information determining algorithm is terminated in a block 42. Conversely, when the video recorder 1 is in the stand-by mode, the television program information determining algorithm proceeds in the block 43.

In the block 43, the switching stage 36 supplies a tuner voltage TU to the tuner input 18 in order to achieve that the tuner 15 transfers a television signal F which can be received via the receiving channel E=1 to its tuner output 19.

In a block 44, which is carried out subsequently to the block 43, it is ascertained whether the television signal F available at the tuner output 19 contains teletext information TI in the blanking intervals of the television signal F. The television program information determining means 34 then supplies page request information SA to the information detection stage 33, and it is checked whether the information detection stage 33 can detect teletext information TI. When the information detection stage 33 cannot detect teletext information TI because no information signal I is conveyed in the television signal F, the process of the flowchart 35 is continued in the block 45.

In the block 45, the switching stage 36 supplies a tuner voltage TU to the tuner input 18 so as to achieve that the tuner 15 transfers a television signal F which can be received via the receiving channel E=2 to its tuner output 19.

In a block 46, which is carried out subsequently to the block 45, it is ascertained whether, in the process in accordance with the flowchart 35, all the receiving channels E that can be selected for receiving a television signal F have already been selected. If all the receiving channels E for receiving a television signal F have already been selected, the process is terminated in the block 42. Conversely, if all the receiving channels E which can be selected by the tuner 15 have not yet been selected, the process is continued in the block 44.

When, in the block 44, it is found that an information signal I is conveyed in the television signal F received via the receiving channel E=2 and supplied to the tuner output 19, the process proceeds to a block 47. In the block 47, the television program information determining means 34 presets a given preferential data block address formed by a preferential teletext page number VTSN defined by the switching stage 36 of the information detection stage 33 for a received information signal I. Such preferential teletext page numbers VTSN are transmitted in the information signals I by television stations, such as, for example, ORF1, ORF2 or ARD, and are known, for example, as so-called "Basic TOP Table", "Multi Page Table" or "Magazine Inventory Page". During the manufacture of the video recorder 1, preferential teletext page numbers VTSN are stored in the additional information memory 38, in correlation with television channel identification information FKI. During the execution of the block 47, page request information SA containing this preferential teletext page number VTSN is applied to the information detection stage 33 and, upon termination of a receiving cycle of the information signal I or upon expiration of a given time interval, it is checked whether teletext information TI has been detected by the information detection stage 33. If teletext information TI has been detected by the information detection stage 33, teletext page numbers TSN can be derived from the detected teletext information TI, these page numbers identifying the teletext information TI of the information signal I in which the television program information FPI is contained. In the present case, a detected teletext page number TSN can be impressed upon the information detection stage 33 as page request information SA. Furthermore, additional information ZU, such as, for example, the number of teletext sub-pages of a teletext page, can be derived from teletext information TI identified by a preferential teletext page number TSN and can be stored in the additional information memory 38 in correlation with the receiving channel identification information EKI of the selected receiving channel E. Subsequently, the process in accordance with the flowchart 35 proceeds in a block 48.

When, in the block 47, no teletext information TI for the given preferential teletext page numbers VTSN can be derived from the information signal I, the process in accordance with the flowchart 35 proceeds to the block 49. In the block 49, after a change-over of the receiving means 14 by the switching stage 36, the television program information determining means 34 can autonomously preset the information detection stage 33 to a data block address stored in the data block address memory 37 and allocated to television signal identification information FKI or receiving channel identification information EKI identifying the received television signal F, in order to determine data block information identified by the data block address. As the block 49 is carried out, a teletext page number TSN is read from the data block address memory 37, this number having been stored in correlation with the number of the receiving channel E=2, which then constitutes receiving channel identification information EKI, and from which already television program information FPI could be derived in a preceding television program information determining algorithm, or which, during the manufacture of the video recorder 1, has been stored in correlation with the television signal identification information FKI received via the receiving channel E=2. The process in accordance with the flowchart 35 proceeds to the block 48 after a teletext page number TSN obtained from the data block address memory 37 has been preset in the information detection stage 33.

In the block 48, it is checked whether the teletext information TI detected by the information detection stage 33 contains television program information FPI. In a first step of this check, it is verified whether the detected teletext information TI complies with the VPT standard (Video recorder Programming by Teletext) and, in addition, contains VPT information. If the teletext information TI complies with the VPT standard, which is the case, for example, for information signals transmitted by the television stations ORF1, ORF2, ARD or ZDF, in which hidden or visible VPT information identifying television program information FPI is contained in the teletext information TI, the television program information FPI can be determined in a particularly reliable manner.

When, in the first step of the check in the block 48, it is found that the detected teletext information TI does not contain hidden VPT information in accordance with the VPT standard, it is verified, in a second step of the check, whether the hidden teletext information TI associated with the given teletext page number TSN is contained in a so-called "packet 26", which characterizes television program information FPI in teletext information TI identified by the teletext page number TSN. Information contained in a "packet 26" is defined in the PDC standard (Program Delivery Code).

When, in the second step of the check in the block 48, it is found that the "packet 26" does not contain hidden information for the identification of television program information FPI in teletext information TI identified by the teletext page number TSN, it is checked, in a third step, whether teletext information TI corresponding to time information is contained in the teletext information TI detected by the information detection stage 33. For this purpose, the teletext information TI is examined for character strings which comply, for example, with the format "XX:XX" or "XX.XX", where "X" is a number from "0" to "9" and the first "X"should be a number from "0" to "2" and the third "X" a number from "0" to "5". These formats correspond to customary time representation formats such as, for example, "13:20" or "13.20". If character strings in accordance with these formats are detected in teletext information TI as time information which recurs at given intervals, as is customary for displaying a plurality of starting times and tittles of television programs in a teletext page, the first time information is interpreted as the starting time of a television program, characters following this number as the title of the television program and subsequent time information in the teletext information TI as the ending time of this television program.

When television program information FPI is already detected in the first step of the check in the block 48, the subsequent steps of the check are not carried out. Likewise, when television program information FPI is detected in the second step of the check in the block 48, the third step of the check is not carried out.

If in all the three steps of the check in the block 48, it is found that no television program information FPI is contained in the teletext information TI detected by the information signal detection stage 33, the process in accordance with the flowchart 35 proceeds in the block 50. Conversely, if, in one of the three steps of the check in the block 48, television program information FPI is detected in the teletext information TI, the process in accordance with the flow chart 35 proceeds in the block 51.

In the block 51, television program information FPI, determined by the television program information determining means 34, is stored in the television program memory 39. In the block 51, the television program information determining means 34 autonomously stores the last preset data block address in the data block address memory 37 in conjunction with television signal identification information FKI or receiving channel identification information EKI identifying the received television signal F after data block information has been derived successfully from television program information FPI. The teletext page number TSN, to which the information detection stage 33 has been preset, is then stored in the data block address memory 37, in correlation with the number of the receiving channel E received by the tuner 15, this number then forming receiving channel identification information EKI. Subsequently, the process in accordance with the flowchart 35 proceeds with the block 50.

In the block 50, in a first step after presetting of a first data block address obtained from the data block address memory 37, the television program information determining means 34 successively presets further data block addresses which alternately have increasing and decreasing numbers in relation to the first data block address, in order to determine data block information. For example, after presetting of a first teletext page number TSN=301 obtained from the data block address memory 37, the television program information determining means 34 presets the teletext page number TSN=302 and, in a subsequent operation in the block 50 of the flowchart 35, to preset the teletext page number TSN=300. Thus, teletext information TI identified by teletext page numbers TSN around the first teletext page number TSN is determined from whose teletext information TI which they identify already television program information FPI was derived in a preceding process of determining television program information FPI.

In a second step of the block 50, the television program information determining means 34 presets a teletext sub-page number of a teletext page number preset in the first step if the additional information memory 38 stores additional information ZU for the received information signal I, indicating that the preset teletext page number has a teletext sub-page number.

In a third step of the block 50, the television program information determining means 34 verifies whether the additional information memory 38 stores additional information ZU which forms transmission information about the teletext page numbers TSN transmitted in the received information signal I and, if the answer is affirmative, checks whether teletext page number TSN preset in the first step of the block 50 is actually transmitted in the information signal I and, if the answer is negative, presets a further teletext page number TSN. As a result of this, it is achieved that for the detection of data block information, the information detection stage 33 can only be preset to data block addresses which relate to data blocks which are actually transmitted in the received information signal I. This precludes waiting times which would occur if the information detection stage 33 was set to a data block address not transmitted in the information signal I.

In a fourth step of the block 50, the television program information determining means 34 checks, if applicable by evaluation of additional information ZU stored in the additional information memory 38, whether, for the information signal I received by the tuner 15 via the receiving channel E, already all the teletext page numbers TSN have been preset which identify, in the information signal I, teletext information TI from which television program information FPI may be derived. If no such additional information ZU has been stored, it is also possible to scan all the teletext pages conveyed in the information signal I for television program information FPI contained in the teletext information TI of these pages. If, in the block 50, a teletext page number TSN has been found which identifies teletext information TI from which television program information FPI might be derived successfully, the process is continued in the block 52.

In the block 52, a teletext page number TSN determined in the block 50 is applied to the information detection stage 33 as page request information SA, and teletext information TI detected by the information detection stage 33 is checked in the block 48 as explained hereinbefore.

If, in the block 50, no teletext page number TSN could be detected which identifies teletext information TI from which television program information FPI could be derived with success, the process proceeds to the block 45. The process in accordance with the flowchart 35 will be described in more detail hereinafter with reference to an example.

The control stage 21 of the recording means 13 can supply recording mode information ABI to the television program information determining means 34 when the recording means 13 has been set to the recording mode. When recording mode information ABI occurs, the television program information determining means 34 determines the television program information FPI stored in the television program memory 39 during the television program information determining algorithm , which television program information FPI should be assigned to the television program recorded at that time by the recording means 13. For this purpose, the television program information determining means 34 compares VPS information identifying the recorded television programs and detected by the decoder stage 32 with VPS information stored in the television program memory 39. In the case of correspondence of the detected and the stored VPS information, the television program information FPI containing the stored VPS information can be read from the television program memory 39.

The television signal processing device 12 further includes a timing stage 53 which can apply time information ZI representing the current time to the television program information determining means 34. Time information ZI for the initialization of the time of the timing stage 53 can then be derived from the teletext information TI determined by the information detection stage 33 or can be set by a user of the video recorder 1 in a manner not shown in FIG. 1. When recording mode information ABI occurs, if the television signal F of a television program is recorded in which no VPS information is transmitted, the television program information determining means 34 determines the television program information FPI stored in the television program memory 13 and relating to the television program currently recorded by the recording means 13 on the basis of the time information ZI supplied to said means by the timing stage 53 and of the received receiving channel E.

The television signal processing device 12 further comprises keyword detection means 54 for determining at least one item of title fragment information of title information of a television program recorded by the recording means 13 as a processed and received television signal F. For this purpose, the keyword detection means 54 is arranged to receive a title of a television program recorded by the recording means 13, this title having been determined by the television program information determining means 34 and is contained in the television program information as title information. Title information is parsed into title fragment information which can be formed by words or parts of words and which are determined as keywords by the keyword detection means 54. This will be described in more detail with reference to an example given hereinafter.

The television signal processing device 12 further comprises a keyword memory 55 for storing at least one keyword determined by the keyword detection means 54 as keyword information SWI. This yields the advantage that all the automatically determined keywords are stored, and thus a database of keywords is obtained which is a very accurate representation of the user's interest profile with regard to the television programs recorded by the user and what future television programs he is likely to be interested in. This will be described in more detail with reference to an example given hereinafter.

In the keyword memory 55, a count of the occurrence of a keyword can be stored, this count being incremented and stored again each subsequent time that this keyword is found by the keyword detection means 54. Keywords and associated recurrence counts can then be stored in the keyword memory 55 as a keyword table shown in FIG. 3. Keywords whose recurrence counts have values below a minimum threshold value can be erased periodically from the keyword memory 55 by the keyword detection means 54. The keyword detection means 54 defines title fragment information as a keyword only if it has a minimum number of characters. This will also be described in more detail with reference to an example given hereinafter.

The television signal processing device 12 further comprises an exclusion memory 57 for storing at least title fragment information which is to be excluded as a keyword by the keyword detection means 54. During the manufacture of the video recorder 1, text information, such as, for example, "if" or "maybe" or "against", are stored in the exclusion memory 57 because these words do not characterize the field of interest of a user.

The television signal processing device 12 further comprises selection means 58 for the selection of at least one television program whose title, which is contained in the television program information FPI, includes at least one given keyword and which currently or soon is or will be receivable as a television signal F via another than the receiving channel E being currently received. For this purpose, the selection means 58 compares keyword information stored in the keyword memory 55 with television program title information stored in the television program memory 39. In response to this comparison, the selection means 58 generates a list of receiving or recording suggestions, this list containing television program information FPI of television programs which currently or soon are or will be receivable by the receiving means 14 as a television signal F of another receiving channel E currently received. The selection means 58 can preset only those keywords whose recurrence counts have values above a selection threshold value which depends on at least one other value of recurrence count stored in the keyword memory 55. This will be described in more detail hereinafter with reference to the example.

The television signal processing device 12 further includes OSD insertion means 59. The OSD insertion means 59 is arranged to receive a television signal F available on the tuner output 19 of the tuner 15. The OSD insertion means 59 is also arranged to receive a television signal FW reproduced from the magnetic tape 25 via the recording and playback line 24. The OSD insertion means 59 is further arranged to receive text information in the form of television program information FPI determined by the selection means 58 from a list of recording suggestions generated by the selection means 58. When text information supplied from the selection means 58 to the OSD insertion means 59 occurs, said OSD insertion means generates a display signal A containing the text information, and supplies the display signal to the output terminal 2. The selection means 58 and the OSD insertion means 59 thus form display signal generating means 60 which can automatically generate a display signal A which contains detected television program information FPI of a television program whose television signal is currently received by the receiving means 14. In addition, the display signal generating means 60 automatically generates a display signal A containing television program information FPI of at least one television program selected by the selection means 58.

By actuating the suggestion programming key 29, suggestion activation information VAI can be supplied to the recording programming stage 28 and to the selection means 58. When suggestion activation information VAI occurs, the display signal generating means 60, which is thus activated manually, generates a display signal A representing television program information FPI of selected television programs. A display signal A generated by the display signal generating means 60 can be supplied to display means formed by the television set 3 so as to display a list of recording suggestions AVL containing selected television programs. Here, the recording programming means is formed by keys represented as the suggestion programming key 29, by the marking key 30, by the recording programming stage 28 and by the display signal generating means 59. With the aid of the recording programming means, television program information FPI of one of the selected and displayed television programs can be marked manually by a user and thereby program the video recorder 1 so as to record the selected television program thus marked.

Teletext information TI detected by the information detection stage 33 can be applied to the OSD insertion means 59. When teletext information TI applied to the OSD insertion means 59 appears, the OSD insertion means generates a display signal A containing teletext information TI, and supplies the display signal A to the television set 3 on which the teletext information TO can be displayed in a teletext display mode, which can be activated in a manner not shown in FIG. 1. By means of the video recorder 1, a user can manually mark at least title fragment information of an displayed item of teletext information TI and thereby define this information as a keyword and store it in the keyword memory 55.

The video recorder 1 and thus the recording means 13 are adapted to automatically record a television program selected by the selection means 58. For this purpose, the selection means 58 can supply recording programming information API to the recording programming stage 28. Recording programming information API includes all the television program information FPI necessary to program the recording of a television program selected by the selection means 56.

The advantages of the video recorder 1 will be illustrated hereinafter by means of an example. It is assumed that the receiving means 14 of the video recorder 1 can receive the television signal F from the television station ORF1 in the receiving channel E=1, the television signal F from the television station VOX in the receiving channel E=2, the television signal F from the television station NED1 in the receiving channel E=3, the television signal F from the television station RTL in the receiving channel E=4, and the television signal F from the television station C+ in the receiving channel E=5. It is to be noted that information signals I are transmitted in the blanking intervals of the television signals F from the television stations ORF1, NED1 and RTL, the information signal I from television station ORF1 conveying additional information ZU about its information signal I at a preferential teletext page number TSN=1OF hex, and the television station NED1 transmitting a so-called "packet 26", and the television station ORF1 transmitting VPT information for identifying television program information FPI in their information signals I. In its information signal I, the television station RTL also transmits television program information FPI but this information is not identified by VPT information, information in a "packet 26", or other hidden information.

Figure 2:
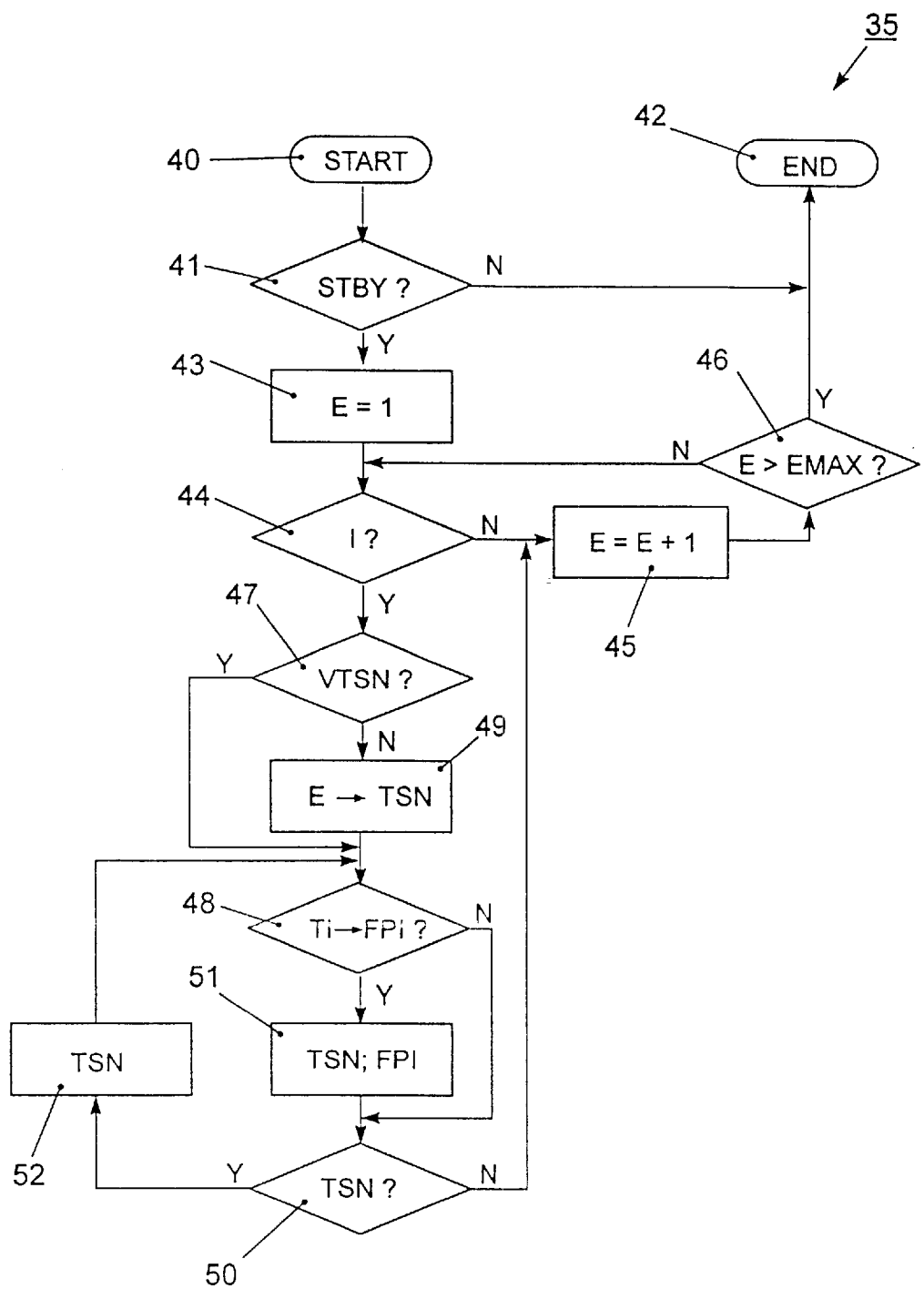
FIG. 2 is a flowchart for explaining a television program information determining algorithm processed in television program information determining means of the television signal processing device.

It is further assumed that the time—for example, 9:00a.m.—is reached to which the video recorder 1 has been set, at which the television program information determining means 34 starts the process in accordance with the flowchart shown in FIG. 2 in order to determine television program information FPI contained in information signals I. As already stated hereinbefore, the television program information determining algorithm starts in the block 40. In the block 41, it is found that the video recorder 1 has been set to its stand-by mode, upon which the process in accordance with the flowchart 35 proceeds to the block 43.

In the block 43, the television program information determining means 34 supplies a tuner voltage TU to the tuner input 18 so as to achieve that the television signal F from the television station ORF1 receivable via the receiving channel E=1 is received at the tuner output 19.

In the block 44, as stated hereinbefore, it is detected that in blanking intervals of the television signal F from the television station ORF1, an information signal I is transmitted, as a result of which the process in accordance with the flowchart 35 proceeds to the block 47. The VPS information, which includes television signal identification information FKI which identifies the television signal F, is then also applied to the television program information determining means 34.

In the block 47, by comparing the television signal identification information FKI determined by the decoder stage 32 with the television signal identification information FKI stored in the additional information memory 38, and by comparing the receiving channel identification information EKI=1 formed by the number of the selected receiving channel E with the receiving channel identification information EKI stored in the additional information memory 38, it is checked whether a preferential teletext page number VTSN has been stored for the television signal F from the television station ORF1. The television program information determining means 34 then detects a preferential teletext page number VSTN=1FO hex stored in the additional information memory 38, in correlation with the television signal identification information FKI of television station ORF1, during the manufacture of the video recorder 1. The television program information determining means 34 then supplies page request information SA containing the preferential teletext page number VTSN=1FO hex to the information detection stage 33. From the teletext information TI detected by the information detection stage 33, the television program information determining means 34 derives that the information signal I includes television program information FPI in teletext information TI identified by the teletext page numbers TSN=311, these teletext page numbers TSN being stored, in correlation with the receiving channel identification information EK=1, as additional information ZU in the additional information memory 38. From teletext information TI identified by these teletext page numbers TSN, television program information FPI about television programs transmitted by the television station ORF1can be derived during subsequent processing in accordance with the flowchart 35. This yields the advantage that determining television program information FPI can be effected particularly rapidly and reliably because television program information FPI is derived directly from the teletext pages defined by the television station ORF1 in the preferential teletext page.

From the teletext information TI detected by the information detection stage 33 and identified by the preferential teletext page number VTSN, it further appears that, for example, the teletext page number TSN=315 has two teletext sub-page numbers TS N 315/1 and TSN=315/2. The television program information determining means 34 also stores this information in the additional information memory 38 as additional information ZU in correlation with the receiving channel identification information EKI=1. This has the advantage that when television program information FPI is determined, television program information FPI can be determined particularly reliably and rapidly from teletext information TI on teletext sub-pages because it is apparent from the teletext information TI identified by the preferential teletext page numbers VTSN for which teletext page numbers teletext information TI is available on teletext sub-pages. On the one hand, it is not necessary, as a result of this, to wait for one or more receiving cycles in order to find out that a teletext pages does not have any teletext sub-pages and, on the other hand, this precludes that teletext information TI from teletext sub-pages is overlooked in determining television program information FPI.

Furthermore, transmission information is derived from the teletext information TI identified by the preferential teletext page numbers VTSN, this transmission information specifying for which teletext page numbers TSN, teletext information TI is transmitted in the information signal I. These teletext page numbers TSN are also stored in the additional information memory 38 as additional information ZU in correlation with receiving channel identification information EKI=1. As a result of this, the television program information determining means 34 will subsequently preset the information detection stage 33 only to page request information SA formed by teletext page numbers TSN which are actually transmitted in the information signal I. Thus, the advantage is obtained that waiting times are avoided which would occur if the information detection stage 33 would be preset to a teletext page number TSN which is not transmitted in the information signal I, which could otherwise be detected only after having awaited one or more receiving cycles of the information signal I.

Finally, in the block 47, the information detection stage 33 is preset to page request information SA for the detection of teletext information TI, this page request information containing, for example, the teletext page number TSN=313 derived from the teletext information TI of the preferential teletext page number VTSN.

Due to the provision of the additional information memory 38 and the storage in the additional information memory 38 of additional information ZU about information signal I of television signals F receivable in receiving channels E, the advantage is obtained that once additional information ZU about an information signal I has been derived is used, during each subsequent derivation of television program information FPI from these information signals I for a more rapid execution of the television program information determining algorithm.

In the block 48, it is checked whether the teletext information TI determined for the teletext page number TSN=313 actually contains television program information FPI, as specified in the preferential teletext page number VSTN. As explained hereinbefore, it is ascertained, in the first step of the check in the block 48, whether VPT information is contained in the detected teletext information TI, which is the case for detected teletext information TI from the television station ORF1.

Television program information FPI thus determined of, for example, four television programs of the television station ORF1, which will be receivable, for example, in the television signal F from the television station ORF1 in the afternoon of the same day, is stored in the television program memory 39 in the block 51. This yields the advantage that, upon completion of the television program information determining algorithm, television program information FPI of a multitude television programs of different television stations are stored on the television program memory 39 and, subsequently, individual ones of these television programs are selected by the selection means 58 and can be displayed on the viewing screen 4 of the television set 3. Moreover, the storage capacity of the television program memory 39 is utilized particularly efficiently because the television program information FPI is derived from the teletext information TI and only the television program information FPI is stored in the television program memory 39.

Furthermore, in the block 51, the teletext page number TSN=313 is stored in the data block address memory 37 in correlation with the receiving channel information EKI=1. This has the advantage that in the case of information signals I, such as, for example, those from the television stations NED1 or RTL, which do not transmit preferential teletext pages in their information signals I, the determination of television program information FPI in the block 49 is started with those teletext page numbers TSN from whose teletext information TI television program information FPI was determined successfully the last time. This has the advantage that it is not necessary to determine, each time again, a first teletext page number TSN which identifies teletext TI in which television program information FPI is transmitted. As a result, television program information FPI can be determined particularly reliably and rapidly.

In the block 50, teletext page numbers TSN are preset in the information detection stage 33 for the detection of teletext information TI containing television program information FPI in such a manner that after the first teletext page number TSN=313 has been preset, the television program information determining means 34 subsequently presets the information detection stage 43 to teletext page numbers TSN=314, TSN 312, TSN=315 and TSN=311 whose numbers alternately increase and decrease with respect to the first teletext page number TSN=313 in order to determine teletext information TI. This has the advantage that, starting from a first teletext page number TSN, which identifies teletext information TI from which television program information FPI has been derived successfully, adjacent teletext pages are scanned systematically for television program information FPI.

It is to be noted that the television program information determining means 34 can also be preset to teletext page numbers TSN which alternately increase and decrease in a different manner, for example, TSN=315, TSN=311, TSN=317 and TSN=309.

The blocks 48, 51, 50 and 52 are carried out until, in the block 50, it is detected that television program information FPI has been derived from all teletext pages identifying teletext information TI which presumably contain television program information FPI. When this is detected, the tuner is switched to receive the television signal F from the television station VOX in the receiving channel E=2 in the block 45. In the block 44, it is found that in the television signal F from the television station VOX, no information signal I is transmitted, for which reason the process in accordance with the flowchart 35 is continued on the block 45.

In the block 45, the tuner is switched to receive the television signal F from the television station NED1 in the receiving channel E=3. From the information signal I supplied by the television station NED1, television program information FPI is derived as described hereinbefore and, in the block 47, it is then found that no preferential teletext page is transmitted in the information signal I. In the block 49, the teletext page number TSN=201, stored in the data block address memory 37 in correlation with the receiving channel identification information EKI=3, is determined from whose teletext information TI during a preceding process in accordance with the flowchart 35 television program information FPI could be derived successfully. This yields the advantage that television program information FPI can be derived particularly rapidly from the information signal I from the television station NED1.

In the block 48, which follows the block 49, it is found, in the first step of the check in the block 48, that the teletext information TI, detected by the information detection stage 33, does not contain VPT information.

In the second step of the check in the block 48, it is found that television program information FPI of the detected teletext information TI is identified by information contained in a so-called "packet 26". During a subsequent repeated execution of the blocks 51, 50, 52 and 48, all the television program information FPI is stored in the television program memory 39. After television program information FPI has been derived from all the teletext pages associated with "packet 26", the process in accordance with the flowchart 35 is continued in the block 45.

In the block 45, the television program information determining means 34 sets the tuner 15 to the reception of the television signal F from the television station RTL via the receiving channel E=4. The further blocks 46, 44, 47 and 49 are carried out as described hereinbefore. In the first step of the check in the block 48, it is found that the teletext information TI detected by the information detection stage 33 does not contain VPT information, and in the second step of the check, it is found that the teletext information TI does not include "packet 26" information. In the third step of the check in the block 48, it is found that, as set forth hereinbefore, television program information FPI can be obtained by deriving time information from the teletext information TI. Television program information FPI, which is subsequently determined in the blocks 48, 51, 50 and 52, is stored in the television program memory 39.

Since no additional information ZU about teletext pages in which television program information FPI is transmitted can be found for the information signal I from the television station RTL, and neither any such additional information ZU is stored in the additional information memory 38, the blocks 48, 51, 50 and 52 are repeated until it is found in the block 50 that all the teletext page numbers TSN transmitted in the information signal I have been applied to the information detection stage one time. Subsequently, in the block 45, the receiving channel E=5 is selected in which the television signal F from the television station C+ is received. In the block 44, it is found that no information signal I is transmitted in the television signal F from the television station C+, for which reason, a receiving channel E=6 is selected in the block 45. In the block 46, it is found that no television signal F is received in the receiving channel E=6 and, consequently, the television program information determining algorithm in accordance with the flowchart 35 is terminated in the block 42.

In the example which illustrates the advantages of the video recorder 1, it has further been assumed that television program information FPI about television programs of the television station VOX and C+ is stored in the computer 9 which forms an Internet server. After completion of the process in accordance with the flowchart 35 to determine television program information FPI from teletext information TI, the television program information determining means 34 obtains television program information FPI from computers connected to the Internet. For this purpose, the television program information determining means 34 reads an Internet address stored in the additional information memory 38 during the manufacture of the video recorder 1, and transfers the Internet address thus read to the interface means 16. As already explained hereinbefore, the interface means 16 then transfers call information AB to the computer 9 identified by the supplied Internet address. An information signal I supplied by the computer 9 upon the occurrence of call information AB is applied to the television program information determining means 34 via the information signal terminal 11 of the video recorder 1 and the interface means 16. Television program information FPI of the television stations VOX and C+, contained in the information signal I, is determined by the television program information determining means 34 and is stored in the television program memory 39. This has the advantage that an information signal I containing television program information FPI can also be received by the video recorder 1 from a computer data network, such as the Internet or, for example, also from a TV cable system, and that television program information FPI can be derived from the information signal I thus received.

In the example given to illustrate the advantages of the video recorder 1, it is assumed that the keyword table 56 shown in FIG. 3 has been stored in the keyword memory 55. The keyword memory 56 stores keywords forming title fragment information, such as, for example, "children", "soccer" or "Diana". Each time that a user records a television program keywords are derived from the title of the television program, which forms title information, as will be described in more detail hereinafter. Since, by recording a television program, the user of the video recorder 1 shows that he is interested in this television program, the keywords derived from the titles of these television programs are characteristic of the field of interest of the user. A recurrence count associated with a keyword in the keyword table 56 indicates how many times a given keyword has already been detected. As is apparent from the keyword table 56, the keywords "soccer", "Magnum", "Diana" and "News" were detected very often in titles of television programs recorded by the user. This shows the interest of the user in television programs relating to "soccer", the television serial "Magnum", reports on "Diana" and "news".

The selection means 58 now automatically determines television programs which can be received in the future and which are of interest to the user. For this purpose, the selection means 58 reads out keywords stored in the keyword memory 55, such as, for example, the keyword "Magnum", and determines television program information FPI stored in the television program memory 39 and relating to television programs whose titles contain the keyword "Magnum". It is then determined, for example, by which television station and when another episode of the serial "Magnum" will be receivable. The television program information FPI of subsequent episodes of the serial "Magnum" thus determined can be displayed as an on-screen display 5 on the viewing screen 4 of the television set 3. This yields the advantage that the attention of the user of the video recorder 1 is drawn to television programs which are presumably of interest to the user and the user will not miss these.

The selection means 58 determines a selection threshold value by forming the sum of the three largest values of the recurrence counts stored in the keyword memory 55—in accordance with the keyword table shown in FIG. 3 these are the values 12+7+7=26—and to divide this sum by the number 10–26/10=2.6. The selection means is henceforth adapted to use, for determining television programs in which a user may be interested, only those keywords whose recurrence counts have value which exceed the selection threshold value of 2.6 thus determined. As a result of this, the advantage is obtained that the selection means 58 only select those television programs whose titles contain a keyword which has already been detected comparatively often and which is therefore of special interest to the user. In this way, changing fields of interest of the user are allowed for automatically because the recurrence count of keywords, such as, for example, "Magnum", are not incremented any further if no further episode of the serial "Magnum" is recorded.

It is to be noted that other methods of determining a selection threshold value are also possible.

Television program information FPI of television programs which are of interest to the user and which have been selected by the selection means 58 can be displayed on the on-screen display 5 automatically and for given time in a first and in a second case of use of the video recorder 1 and can be displayed as a list of recording suggestions on the on-screen display 5 through actuation of the suggestion programming key 29 by the user in a third case of use. In order to illustrate the advantages of the first case of use, it is assumed that the user has set the tuner 15 to receive a television signal F from the television station RTL via the receiving channel E=4 by actuating the receiving channel selection key 31. As set forth hereinbefore, the selection means has detected that a further episode of the television serial "Magnum" is transmitted by the television station ORF1, for example, at 18:00 hours as the starting time and, consequently, can be received via the receiving channel E=1. The selection means 58 compares the time information ZI supplied with the starting times of the television programs selected by the selection means 58. If, for example, at 17:59 hours the selected television program "Magnum" will be receivable as a television signal F from the television station ORF1 via the receiving channel E=1 and the tuner has been set to receive the television signal F from the television station RTL via the receiving channel E=4, the display signal generating means 60 automatically generates a display signal which contains the television program information FPI of this selected television program "Magnum". Thus, for example, at 17:59 hours, an on-screen display 5 is shown on the viewing screen 4 of the television set 3, for example, for 5 seconds, to indicate the beginning of another episode of the television serial "Magnum" of the television station ORF1 via the receiving channel E=1. Thus, it is achieved advantageously that the attention of a user of the video recorder 1, while viewing a television program of a television station, is drawn to the beginning of a television program from another television station which is presumably of interest to the user by means of an on-screen display 5 briefly before the beginning of this television program. As a result of this, the user is reminded automatically and in due time of the beginning of television programs which are of interest to him.

In the second case of use, the display signal generating means 60 generates a display signal A so as to enable an on-screen display 5 on the viewing screen 4 of the television set 3, which immediately after the start of the video recorder 1 the user is notified, for example for 20 seconds, of television programs which are of interest to the user and which can be received at that time or which can be received soon. This has the advantage that immediately after the video recorder 1 has been switched on the user's attention is drawn to television programs which are of interest to the user.

Now the third case of use is described in which television programs F selected by the selection means 58 can be displayed on the viewing screen 4 of the television set 3. By actuation of the suggestion programming key 29, an on-screen display 5 is obtained on the viewing screen 4 of the television set 3, which shows the television program information FPI selected by the selection means 58 in a list of recording suggestions. Depending on the television program information FPI determined by the television program information determining means 34 and stored in the television program memory 39, the list of recording suggestions contains, for example, television program information FPI of television programs which can be received from the television stations ORF1, NED1, RTL, VOX and C+ within the next week. By actuating the marking key 30, the position of a cursor shown in the on-screen display 5 can be changed, thus enabling one of the selected and displayed television programs to be marked by the user. When one of the selected and displayed television programs is marked by the user, the television program information FPI of this television program is transferred from the selection means 58 to the recording programming stage 28 and the video recorder 1 is then programmed to record this television program. This yields the advantage that a particularly simple method of programming the video recorder 1 to record a selected television program.

To illustrate the advantages of the video recorder 1 an example of the automatic determination of keywords from title information of television programs recorded by the video recorder 1 is described hereinafter. It is now assumed that the user of the video recorder 1 has activated the video recorder 1 in order to record a television program entitled "World Championship Soccer: Austria against Germany". The video recorder 1 may have been activated for this recording by an arbitrary programming method, for example, by Show View programming, VPT programming or directly by actuation of the recording key 23. As described hereinbefore, the title of a recorded television program is determined in the television program information determining means 34 upon the occurrence of recording mode information ABI and is transferred to the keyword detection means 54. By the keyword detection means 54, the title "World Championship Soccer: Austria against Germany", which forms title information is parsed into the title fragment information "Soccer", "World", "Championship", "Austria", "against", and "Germany". Subsequently, the keyword detection means 54 determines whether one of the title fragment information items is stored in the exclusion memory 57. The keyword detection means 54 then detects that the title fragment information "against" is stored in the exclusion memory 57 because this title fragment information is not suitable for satisfactorily characterizing the user's interest. As a result of this, this title fragment information "against" is not interpreted as a keyword by the keyword detection means 54.

Subsequently, the keyword detection means 54 checks whether each title fragment information item has a minimum number of at least four characters. This has the advantage that title fragment information items, such as, for example, "the", "as" or "in", are not interpreted as keywords by the keyword detection means 54 because they do not adequately characterize the user's interest.

Keywords thus determined by the keyword detection means 54 are stored in the keyword memory 55. The keyword detection means 54 also determines whether a detected keyword, such as, for example, "soccer", has already been detected and has consequently already been stored in the keyword memory 55. As is apparent from the keyword table 56 shown in FIG. 3, the keyword "soccer" has already been detected seven times, as a result of which the value of the recurrence count of the keyword "soccer" is incremented to the value 8 and is stored in the keyword memory 55. Likewise, the values of the recurrence counts of the previously detected keywords "World", "Championship" and "Austria" are incremented and stored. The keyword "Germany" is found for the first time and therefore this keyword is entered into the keyword table 56 with the value "1" of the recurrence count and is then stored in the keyword memory 55. Keywords determined automatically in this manner advantageously agree very accurately with the user's interest. Changing fields of interest of the user can be detected by means of the values of the recurrence counts and can be taken into account, as explained hereinbefore, in the determination of television programs which are of interest to the user by the selection means 58.

All the keywords 55 stored in the keyword memory 55 and the values of their recurrence counts are checked periodically, for example once a month, by the keyword detection means 54. The keywords whose recurrence counts have values below a minimum threshold value are then erased from the keyword memory 55 by the keyword detection means 54. This yields the advantage that rarely detected keywords are periodically removed from the keyword memory 55 and the storage capacity of the keyword memory is thus utilized effectively. Furthermore, it is thus achieved that only those keywords are used for determining which television programs are likely to be of interest to the user which have been detected not too long ago and frequently enough.

The video recorder 1 further makes it possible for the user to manually select keywords to be used for the autonomous and automatic selection of television programs by the selection means 58. For this purpose, as explained hereinbefore, teletext information TI determined by the information detection stage 33 can be displayed on the viewing screen 4 of the television set 5 in the teletext display mode of the video recorder 1. By the actuation of the marking key 30, the position of a cursor shown on the viewing screen 4 can be changed and title fragment information of the displayed teletext information can be marked manually and subsequently stored in the keyword memory 55 by the keyword detection means 54 in a manner not shown in FIG. 1. This method of manually selecting a keyword is particularly simple and makes it possible for the user to store also personally selected keywords in the keyword memory 55 and thus additionally define his fields of interest.

It is to be noted that a television signal processing device provided in a television set may include keyword detection means for determining keywords from title information of actually received television programs. This has the advantage that the fields of interest of the user is derived from title information of actually received television programs selected by the user.

It is to be noted that the video recorder may also be adapted to automatically record television programs selected by the selection means as potentially of interest to the user on the magnetic tape 25 of the magnetic-tape cassette 26. Thus, it would be achieved that, for example, at night, the user can choose from a selection of television programs which have already been recorded during the day and which are, for the greater part, of interest to him. This automatic recording of television programs which are of interest to the user can be used particularly advantageously in a recording arrangement, for example, a digital recording arrangement, having a very large memory—for example, a magnetic or an optical disc—for the recording of television programs.

It is to be noted that the display means formed by the television set 3 in the example of an embodiment as shown in FIG. 1 may also be formed by a display provided in a video recorder.

It is to be noted that it is not necessary to provide a television program memory for the storage of television program information determined by the television program information determining means. However, for determining television programs which are of interest to the user and which each have title information containing a given keyword, it is then each time necessary to carry out the television program information determining algorithm.

It is to be noted that an information detection stage may be adapted not only to detect teletext information TI formed by a teletext page number TSN for each receiving cycle of the information signal. It has proven to be advantageous if the information detection stage can be preset to at least two teletext page numbers TSN for detecting teletext information TI in each receiving cycle. In this respect, it has proven to be particularly advantageous if in the television program information determining algorithm, the television program information determining means can preset the information detection stage to a teletext page number stored in a data block address memory and a teletext page number TSN of the received information signal, obtained from a preferential teletext page. This yields the advantage that television program information FPI can be derived in parallel from teletext information TI of two teletext pages, thus enabling television program information to be determined particularly rapidly.

It is to be noted that a television signal processing device in accordance with may, for example, also be provided in a television set. Such a television set may also be adapted to receive a digital television signal (DVB, DTTV).

It is to be noted that, in order to enable an improved periodic erasure of keywords, it is also possible to store, for each keyword, the date of the last detection of this keyword in a keyword table.

It is to be noted that by means of automatically determined keywords, it is also possible to select teletext pages which are of interest to the user and which can be displayed in the teletext display mode.

What is claimed is:

1. A television signal processing device comprising:

receiving means for receiving at least one television signal in at least one receiving channel receivable by the receiving means, and for receiving at least one information signal;

television program information determining means for determining and storing television program information contained in one or more information signals and relating to television programs of at least one receivable receiving channel;

display signal generating means for automatically generating a display signal containing detected television program information of a television program whose television signal is currently received by the receiving means; and selection means for selecting at least one television program having title information, contained in the detected television program information, containing at least one given keyword and being currently receivable or will be shortly receivable by the receiving means as a television signal in another than the currently received receiving channel, wherein said display signal generating means automatically generates a display signal containing television program information of the at least one selected television program, characterized in that said television signal processing device further comprises:

keyword detection means for detecting at least one item of title fragment information of title information of a television program received by the receiving means as a keyword, said keyword detection means providing at least one detected keyword to said selection means for use as said given keyword.

2. The television signal processing device as claimed in claim 1, characterized in that said television signal processing device further comprises:

a keyword memory for storing at least one keyword detected by the keyword detection means.

3. The television signal processing device as claimed in claim 2, characterized in that the keyword memory further stores a recurrence count for each keyword, said recurrence count being incremented upon each further detection of this keyword by the keyword detection means, and in that the selection means applies only those keywords whose recurrence counts have values which exceed a selection threshold value depending on at least one other value of a recurrence count stored in the keyword memory.

4. The television signal processing device as claimed in claim 3, characterized in that said keyword detection means periodically erases from the keyword memory keywords having recurrence count values below a minimum threshold value.

5. The television signal processing device as claimed in claim 1, characterized in that the keyword detection means detects only title fragment information having a minimum number of characters as keywords.

6. The television signal processing device as claimed in claim 1, characterized in that said television signal processing device further comprises:

an exclusion memory for storing at least title fragment information which is to be excluded as a keyword by the keyword detection means.

7. A television signal processing device comprising:

receiving means for receiving at least one television signal in at least one receiving channel receivable by the receiving means, and for receiving at least one information signal;

television program information determining means for determining and storing television program information contained in one or more information signals and relating to television programs of at least one receivable receiving channel;

display signal generating means for automatically generating a display signal containing detected television program information of a television program whose television signal is currently received by the receiving means; and selection means for selecting at least one television program having title information, contained in the detected television program information, containing at least one given keyword and being currently receivable or will be shortly receivable by the receiving means as a television signal in another than the currently received receiving channel, wherein said display signal generating means automatically generates a display signal containing television program information of the at least one selected television program, characterized in that the receiving means receives an information signal in blanking intervals of a received television signal, said information signal containing teletext information displayable on display means, and in that at least title fragment information of the teletext information can be marked manually and can thus be defined as a keyword.

8. A recording arrangement comprising:

recording means for recording a processed received television signal of a television program;

a television signal processing device comprising:

receiving means for receiving at least one television signal in at least one receiving channel receivable by the receiving means, and for receiving at least one information signal;

television program information determining means for determining and storing television program information contained in one or more information signals and relating to television programs of at least one receivable receiving channel;

display signal generating means for automatically generating a display signal containing detected television program information of a television program whose television signal is currently received by the receiving means; and selection means for selecting at least one television program having title information, contained in the detected television program information, containing at least one given keyword and being currently receivable or will be shortly receivable by the receiving means as a television signal in another than the currently received receiving channel, wherein said display signal generating means automatically generates a display signal containing television program information of the at least one selected television program; and keyword detection means for detecting at least one item of title fragment information of title information of a television program received as a processed received television signal recorded by the recording arrangement as at least one keyword, said keyword detection means applying at least one detected keyword to said selection means for use as said given keyword.

9. The recording arrangement as claimed in claim 8, characterized in that said display signal generating means is activatable manually to generate a display signal representing television program information of selected television programs, and in that the display signal is applicable to display means for displaying a list of recording suggestions containing television program information of at least one selected television program, and in that television program information of one of the selected and displayed television programs can be marked manually by recording programming means and the recording arrangement is thereby programmable to record the television program thus marked.

* * * * *